H. E. SCHULSE.
WATER COOLER.
APPLICATION FILED DEC. 2, 1915.
1,228,836.
Patented June 5, 1917.
2 SHEETS—SHEET 2.
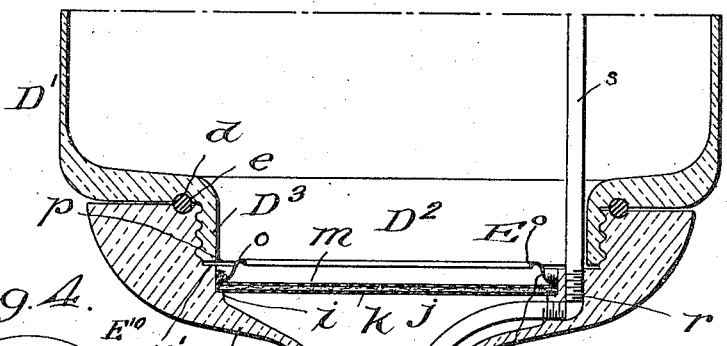
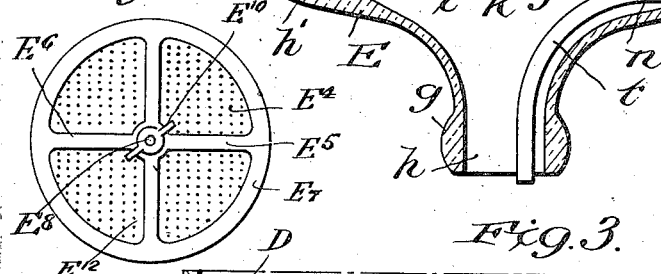
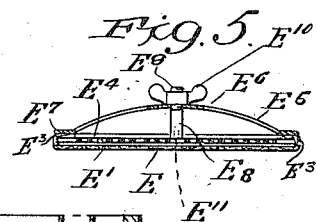
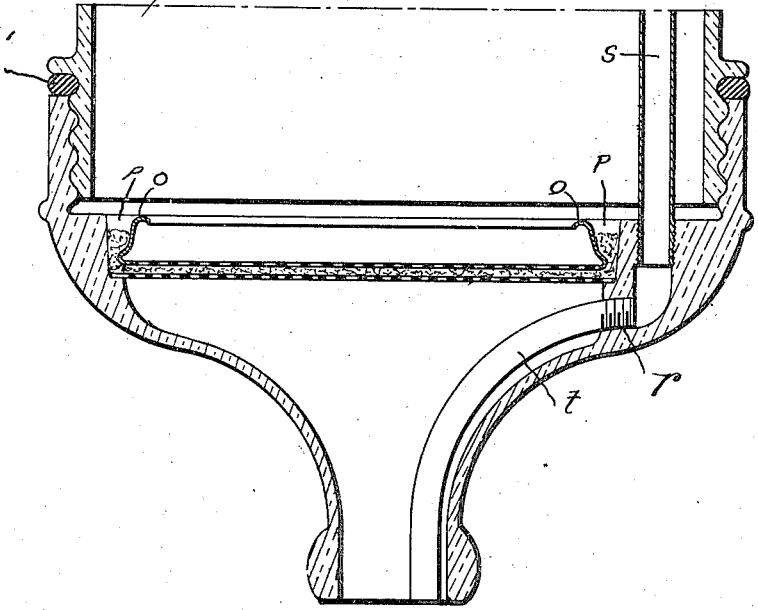
Witness. Anna V. Doyle.
Inventor
Herman E. Schulse
By Victor J. Evans
Attorney

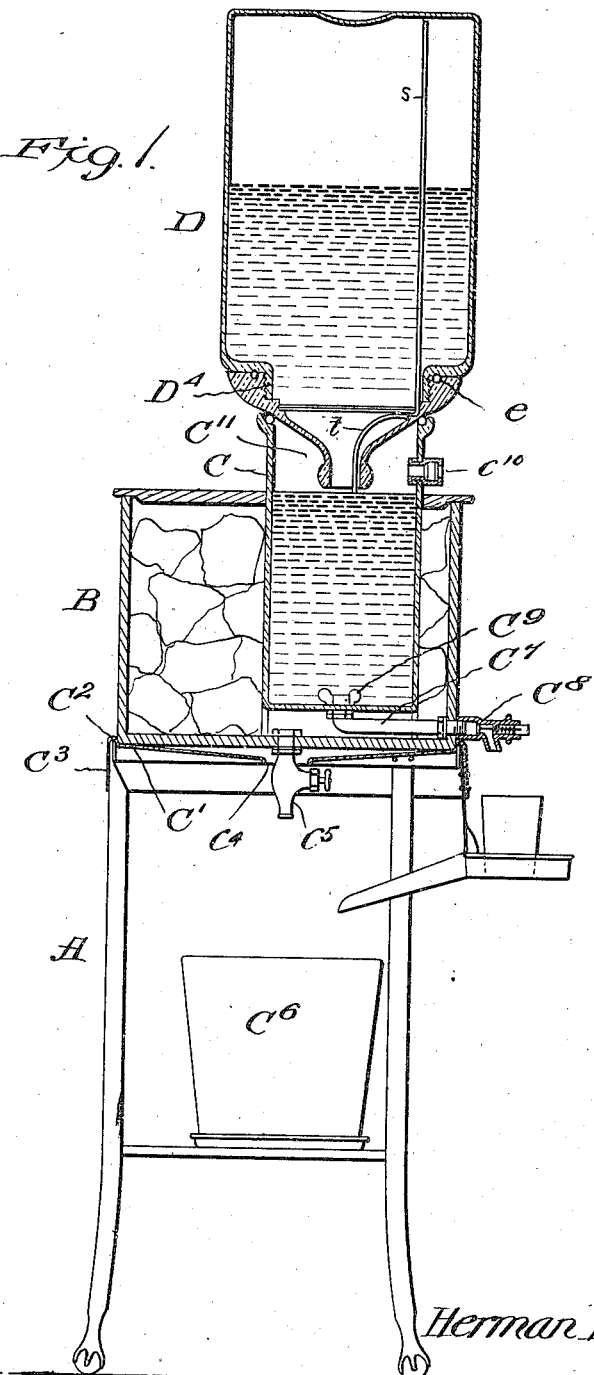

UNITED STATES PATENT OFFICE.

HERMAN E. SCHULSE, OF BAYONNE, NEW JERSEY, ASSIGNOR TO SAFETY FIRST FILTER COMPANY, INC., A CORPORATION OF NEW YORK.

WATER-COOLER.

1,228,836.     Specification of Letters Patent.    Patented June 5, 1917.

Application filed December 2, 1915. Serial No. 64,731.

*To all whom it may concern:*

Be it known that I, HERMAN E. SCHULSE, a citizen of the United States, residing at Bayonne, in the county of Hudson and State of New Jersey, have invented new and useful Improvements in Water - Coolers, of which the following is a specification.

My invention relates to certain new and useful improvements in water-coolers designed to dispense mineral, distilled or other waters, directly from a container, or original package, bottle or demijohn, in the most satisfactory and sanitary manner, and without danger of the contents being contaminated in handling and properly placing the package, bottle or demijohn in position upon a supporting body portion.

Primarily, the present invention is designed to take the place of that class of water coolers so extensively used at the present time for dispensing mineral, distilled or other special waters, by supplying the container, bottle, or demijohn with its own means for the purification of the liquid contents thereby enabling the ordinary city service water to be used in the aforesaid containers, bottles or demijohns and to be filtered and purified to rid it of suspended and other impurities before it is delivered to the proper or cooling receptacle for withdrawal for human consumption.

A leading object of the present invention is, therefore, to construct or otherwise provide the container, bottle, or demijohn in which the water is first placed, with a filter attachment, which may be fashioned to fit within or in fact to form in whole or in part the discharge neck of the bottle whereby the water in its passage from the inverted bottle, as well understood in this art, must pass through the filter to be thereby relieved of its impurities before it is delivered into the usual ice-surrounded cooling vessel or chamber, from which latter it is drawn for drinking purposes.

Another object of the invention resides in the provision of a filtering attachment which will consist of a heterogeneous body consisting of strata of filtering bodies or elements, respectively of such inherent qualities which will operate to destroy bacteria, absorb objectionable odors and absorb and effectually filter all suspended matter in the liquid, and I aim also to associate with said elements, means for compressing the same whereby to cause a certain distorted or enlarged peripheral packing surface to be formed about the entire object which will find operative contact with the inner walls of the liquid container and thereby eliminate all possibility of leakage between said walls and the peripheral edge of the attachment. It is also deemed desirable to make mention of the fact that the mentioned compressing means includes a body member, open in part so that the main separating and filtering surfaces can be actively exposed, and that said member is of a rigid character in order that the different strata which are of a fragile nature will be protected and the possibility of the same being broken or injured will be reduced to a minimum. This feature is important in that the moment the strata become cracked or foraminated they are no longer useful for my purpose of causing the liquid to pass through constantly homogeneous masses or layers of materials which are themselves the means of effecting the described separation of bacteria from the water or liquid and a purification thereof.

With the above and other objects in view my invention consists of the parts and the construction, arrangements and combinations of parts, which I will hereinafter describe and claim.

In the accompanying drawing, forming part of this specification and in which similar reference characters indicate like parts in the several views:—

Figure 1 is a vertical section through a liquid container embodying my invention.

Fig. 2 is a vertical sectional view of the same.

Fig. 3 is a vertical sectional view of a container of slightly modified form.

Fig. 4 is a plan view of a slightly modified form of filtering attachment.

Fig. 5 is a vertical section therethrough.

Inasmuch as the present invention has relation primarily, to the construction of the container, bottle, or demijohn, in which is stored, for subsequent use the water to be consumed, it is not essential that a complete water-cooling outfit should be illustrated and described, since the container, bottle or demijohn is capable of successful use with the different types of water-coolers now commonly used for dispensing mineral, distilled or other waters for drinking purposes, but to properly associate the container, bottle, or demijohn with the leading parts of the aforesaid water-coolers, I have shown a stand A, upon which is supported a main vessel or receiver, B, within which is located a water containing vessel, C, which it is customary to surround or pack with broken ice, said vessel, C, being designed as a receiver for the water delivered from the container, bottle, or demijohn, D, in which the water is originally contained and from which it is discharged into the vessel, C, to take the place of water dispensed from said last-named vessel.

The stand herein shown is provided with a drain shelf and support $C'$ having its edge $C^2$ upstruck and secured to the stand as at $C^3$. This shelf has its walls inclined toward the center and away from the base of the receiver, B, in order that all water of condensation will find free passage upon said shelf. At the center, the shelf is provided with an opening $C^4$ through which a drain valve $C^5$ upon the receiver B extends whereby the waste water may be conducted to a receiver $C^6$, carried by the stand. The base of the vessel C receives the angular end of a drain-off pipe $C^7$, the outer end of said pipe being extended through the receiver B and beyond the latter, it is provided with a faucet $C^8$. The angular branch of this pipe has a winged nut $C^9$ connected therewith in order that the vessel C, may be removed when desired and thoroughly cleaned.

As the leading part of the present invention relates, essentially, to the container, bottle, or demijohn in which the water to be dispensed is originally contained, I will now describe a preferred form of the same, while at the same time I do not wish to be understood as limiting myself to the precise, structural features of the same, or to the exact design shown, since modifications of the same are quite apparent without affecting the functional operations and are, accordingly, within the scope of the invention.

As shown, the container, bottle, or demijohn, D, is preferably composed of plain or frosted glass, porcelain, or other suitable material, and it may be of cylindrical or other desired cross-sectional form. Two types of containers, bottles, or demijohns, are shown. In Figs. 2 and 3 the container D, has substantially a uniform diameter throughout and is devoid of an integral or permanent neck portion; in Fig. 2, the container, bottle, or demijohn, $D'$, is formed with a reduced neck portion, $D^2$, having external threads, $D^3$. The container or bottle, D, Fig. 1, also has external threads, $D^4$, around its open end and at the base of these annular threads there is formed an annular rib, $d$, which serves as a shoulder or seat, for a rubber gasket or other packing ring, $e$, intended to preserve a liquid-tight joint between the open end of the container or bottle and the separable neck with which the bottle of Fig. 1 is supplied. In the construction shown in Fig. 3, a similar gasket or packing $e'$ is employed having a similar object in view.

Both types of containers, bottles or demijohns referred to and shown in the drawings are supplied with separable necks and these necks have self-contained means for filtering and thereby purifying the contents of the container or bottle during its passage therefrom to the filtered and cooling water receptacle, C, the filter frame or casing having such form that it simulates the appearance of the neck portion of any ordinary bottle, and of the bottles used in water-coolers of the type herein mentioned.

That this phase of the invention may be better understood, I have shown the filter shell or casing, E, as having an opening at one portion of sufficient size to receive the open end of the neckless container, bottle, or demijohn of Figs. 1 and 2, and having internal threads to screw into engagement with the external threads, $D^3$, of said container and to compress the gasket or packing $e$, and form a water-tight joint between these parts.

The external surface of the filter shell or casing is shown as formed with reverse curves to simulate the neck-portion of the usual bottle and these sides taper to form a reduced neck or mouth, $g$, similar to the usual neck of a bottle and through the mouth, $h$, of which the water passes to the cooling container, C.

The separable neck-portion of the container, bottle or demijohn as represented by the filter shell or casing may be composed of glass, hard rubber or other appropriate material, an interior to the same is formed a broad shoulder $h'$ against which the open end of the container, bottle or demijohn firmly seats, when the filter shell or casing is screwed onto the open end of the bottle.

On the interior of the filter frame or casing and spaced from the aforesaid shoulder, $h'$, is a second shoulder, $i$, which is designed to firmly seat some appropriate form of filter medium. In the illustrated form of this filter medium, I employ a perforated sheet or plate, $j$, of hard rubber, aluminum, or other suitable metal, or other material upon which is placed a sheet, cloth pad or mass of asbestos fibers, $k$, or the like, or some other substance suitable as a filter bed. In practice I prefer to use as the filter bed, asbestos fibers, in the form of cloth sheets or pads, and wherein the sheet or pad is of sufficient diameter or dimensions to enable the edge of the same to be turned up, in the present case against the vertical wall of the filter casing between the aforesaid shoulders, h' and i.

To complete the filter medium I employ a second perforated plate, m, whose circumferential edge is formed or provided with an annular upstanding rim or ring, n, having an inturned edge, o, said rim or ring being preferably slightly tapering to form a tapering space, p, for the reception of the upturned edge of the asbestos sheet, or bed, and into which space this edge of the asbestos sheet is closely packed, to intimately compact the fibers and produce a joint which, as shown, in practice, will eliminate all danger of the leakage of unfiltered water thereabout and into the liquid cooling container, C.

The annular rim or ring, n, I prefer to term a "setter" as its prime function is to "set" or clamp the asbestos bed or fibers between the aforesaid perforated plates, j and m, and to bind the pad or sheet of asbestos more or less tightly down upon the plate, j, and at the angle formed by turning the edge of the sheet upwardly along the inner wall of the filter casing. The filter medium is thus confined in place in an intermediate portion of the shell or casing and it is readily insertible into and removable from said shell or casing through the larger end of the same namely, the end which connects directly with the threaded end of the container, bottle, or demijohn.

The shell or casing of the filter is also formed with a substantially right-angled passage, r, and to one end of this passage is connected, by threads or otherwise, a vent pipe, s, said pipe thence extending through the container, bottle, or demijohn to a point near the opposite end thereof and which point will be slightly above the water level when the bottle is inverted and is in its operative position for dispensing purposes.

The other end of the passage, r, is connected to a pipe, t, which extends along the inner wall of the filter shell or casing below the filter medium, and is preferably made to substantially conform thereto, said pipe, t, having its lower end passing through the lower or outlet end of the casing and that portion thereof which simulates the neck of the bottle and terminates slightly below the mouth thereof and is designed to be submerged in and to be sealed by the water in the receptacle, C. In practice, the tubes, s, and t, and connecting passage serve as a vent, or intake for air, and the air admitted to the tubes when the lower end of tube, t, is uncovered by the lowering of the water level in the container, C, enters the top of the bottle or demijohn to overcome the vacuum which tends to form as the water is drawn therefrom to take the place of the liquid drawn from the container, C, and to eliminate the violent bubbling which is so common to the water coolers of like character now in use and wherein the air is discharged through the body of water in the bottle and gives up its impurities to the water and causes the formation of bubbles of large size and of considerable pressure and which on bursting in the space above the water create spasmodic pulsations in and general disturbance of the water and the stirring up of sedimentary matter which commonly collects about the interior mouth of the bottle. By extending the lower end of the air tube, t, slightly below the mouth of the bottle and which mouth is represented in the present instance by the lower portion of the filter shell or casing, this end of the tube is sealed by the water in the container, C, but the lower end of the bottle, represented by the lower end of the filter shell or casing is not submerged; in fact, it does not come in contact with the water to be consumed and consequently there can be no contamination of the water entering the container, C, by reason of this water coming in contact with parts of the bottle which are usually handled by those whose duty it is to renew the bottles at stated times.

The purpose of the vent tubes, s and t is well understood to be to seal the bottle against the admission of air except while the water is being drawn from the container, C. While the lower end of the tube, t, is submerged air cannot enter the bottle and water accordingly will not flow therefrom, but as soon as the water level in the container, C, lowers sufficiently to uncover the end of the tube, t, air is admitted to the bottle and the flow of water therefrom commences and continues until the end of the tube is again covered by the rise of the level of the water in the container, and when this occurs, there will be no further feed of water into the container, C.

The arrangement also is such that the water in the cooling receptacle, C, is maintained at a more uniform temperature, in that the water is delivered into the same, from the bottle, more gradually and in no manner violently.

Also, by placing the joint between the filter-shell or casing and the bottle outside of the latter, even if there should occur a slight leak at this point, the water would run down outside of the filter shell and onto the main ice vessel, B, and not into the filtered water container.

I wish also to mention that the walls of the container C are wholly spaced from the walls of the vessel B in order that the former will be fully subjected to the action of the refrigerant. The vent tube t comes on a level with the top of the vessel B and as a consequence thereof, no water will rise above the cooling surface of said vessel as will be observed on reference to Fig. 1. The container is provided with an air filter $C^{10}$ which opens to the air chamber $C^{11}$.

In the form of the invention shown in Figs. 4 and 5, the filtering attachment consists of a sheet of asbestos cloth E for arresting all suspended matter and above the same is arranged a film-like mass of powdered coke E' and charcoal, the marginal surfaces of this mass being disposed within the marginal edges of the asbestos cloth. This mass of coke and charcoal serves to absorb all objectionable odors contained in the body of liquid. After treating the cloth E in this manner, I place a mixture of asbestos fibers upon the mass E, reinforcing said fibers with mesh material $E^4$. These fibers are arranged within the edge $E^3$ of the cloth E and the marginal edge of the latter is then turned over and the whole structure compressed, one stratum against another by means of a presser $E^5$. Said presser consists of a yoke $E^6$ of metal, having an attaching flange $E^7$ secured against the fold $E^3$ by a clamp which includes a central lug $E^8$ threaded at $E^9$ and provided with a nut $E^{10}$ which may be brought into clamping contact with the yoke. This lug is secured to the filtering body by means of a screw $E^{11}$.

The presser is provided with relatively large openings $E^{12}$ which serve to permit the liquid to freely flow to the vessel C from the container D. The yoke is of concavo-convex form in order that it will be relatively springy and further for the purpose of permitting the operator to freely handle the structure when placing the same in or removing it from the container without touching the filtering medium. Said yoke also gives rigidity to the filtering bodies and it insures to a large extent against accidental breakage thereof.

What is claimed as new is:—

1. The combination with a filtered water receiver having a draw-off, of a liquid dispensing and filtering vessel mounted thereon and having a self-contained filter through which the liquid must pass before reaching the outlet of said vessel, said dispensing vessel having an air vent tube at the mouth end entering said receiver and adapted to be sealed and unsealed by the level of the liquid therein.

2. The combination with a filtered water receiver having a draw-off, of a liquid dispensing and filtering vessel mounted thereon and having its mouth end provided with a filtering medium, and an air-vent tube in the filtering vessel having an inlet end adapted to enter the receiver and to be sealed and unsealed by the level of the filtered water therein.

3. The combination with a filtered water receiver having a draw-off, of a liquid dispensing and filtering vessel mounted thereon and having a neck portion, a filter medium fixedly secured in said neck portion, and an air-vent tube fixed to said neck portion and having an inlet end extending through the mouth of the dispensing vessel and into the receiver and adapted to be sealed and unsealed by the level of the liquid in said receiver.

4. The combination with a filtered water receiver, of a liquid dispensing and filtering vessel, said receiver having an open end adapted to receive the discharge end of said vessel when the latter is inverted, a filter in said vessel and through which the contents of the latter must pass out of the vessel, said receiver having its lower portion provided with a draw-off, and an air-vent tube extending through said vessel and through the discharge end of the same and into said receiver and adapted to be sealed and unsealed by the level of the water in said receiver.

5. The combination with a filtered water receiver, of a water containing vessel having a separable neck-portion provided with a filtering medium and an air-vent tube, said tube adapted to extend beyond the neck portion of said vessel and into the receiver and adapted to be sealed and unsealed by the level of the water in the receiver, said receiver having a draw-off connected with its lower portion.

6. A water-containing vessel having a separable neck-portion provided with a filter medium and an air-vent tube, said tube adapted to extend into the vessel to a point substantially above the water level thereof, and said tube having one end extending through the neck of the vessel to a point below the end thereof.

7. A water-containing vessel having one end open and provided with external threads, a shell or casing internally threaded for attachment to said vessel and adapted to form the neck-portion thereof, said shell or casing having a filter medium obstructing the water passage, a vent tube fixed to the shell or casing and extending from a point below the delivery end of the shell or casing to a point above the water level of the vessel.

8. A water-containing and filtering vessel, having one end open and provided with external threads, a shell or casing internally threaded for attachment to said vessel and adapted to form the neck-portion thereof, said shell or casing having a filter medium obstructing the water passage, said shell or casing having an angular passage formed in it, a vent tube secured to one end of said passage and extending into the vessel to a point above the water level thereof, and a second tube connected to another end of said passage and extending along the inner wall of said neck-portion to a point beyond the end of said neck-portion.

9. A liquid container having a discharge opening and a removable filtering element located above said opening and having a peripheral packing surface in direct and yielding contact with the inner walls of said container to seal the joint between said element and the container.

In testimony whereof I, affix my signature in presence of two witnesses.

HERMAN E. SCHULSE.

Witnesses:
 GEO. A. BYRNE,
 ANNA V. DOYLE.